United States Patent [19]

Perwas

[11] 3,754,333
[45] Aug. 28, 1973

[54] SCRIBER SETTING HEIGHT GAGE

[76] Inventor: Ludwig F. Perwas, Mountainview Avenue, Orangeburg, N.Y. 10962

[22] Filed: Sept. 12, 1968

[21] Appl. No.: 759,340

Related U.S. Application Data

[63] Continuation-in-part of Ser. No. 501,220, Oct. 22, 1965, abandoned.

[52] U.S. Cl. ................................................ 33/170
[51] Int. Cl. ............................................. G01b 5/00
[58] Field of Search ....................... 33/169, 170, 171

[56] References Cited
UNITED STATES PATENTS

| | | | |
|---|---|---|---|
| 2,463,151 | 1/1949 | Campbell | 33/170 |
| 2,819,530 | 1/1958 | Webber | 33/169 R |
| 3,180,029 | 4/1965 | Perwas | 33/170 |
| 3,184,856 | 5/1965 | Theverkauf et al. | 33/169 R |
| 3,106,022 | 10/1963 | Milan | 33/170 |
| 3,115,708 | 12/1963 | Roy | 33/170 |
| 3,176,406 | 4/1965 | Williams | 33/170 |
| 3,258,845 | 7/1966 | Wiegel | 33/170 |

Primary Examiner—Harry N. Haroian

[57] ABSTRACT

A device for checking dimensions of machine parts or the like, consisting of a dual inter-dependent keyed linear structures having inter-connected operating elements to maintain the unique multiple gage stack feature of my U.S. Pat. No. 3,180,029 with the use of much smaller gage blocks, to accommodate an extra large micrometer thimble graduated about its circumference to one hundred thousandths in ten thousandths of an inch, permitting when the micrometer screw thread is 10 threads to an inch to obtain a reading within one turn of the thimble when the one hundred thousandths gage blocks are utilized and within ten turns when the one inch gage blocks are used. A scriber setting mechanism is incorporated to allow the setting of a scriber, that is secured in a standard height gage, to a required height by utilizing the spring loaded scriber setting arms instead of the spring loaded dial indicator point that would be held in another standard height gage. Although the gage stack and scriber setting unit is extended the micrometer thimble remains within easy reach for comfortable manipulation.

3 Claims, 43 Drawing Figures

Patented Aug. 28, 1973

INVENTOR.
LUDWIG F. PERWAS

INVENTOR.
LUDWIG F. PERWAS

INVENTOR.
LUDWIG F. PERWAS

Patented Aug. 28, 1973 3,754,333

INVENTOR.
LUDWIG F. PERWAS

INVENTOR.
LUDWIG F. PERWAS

Patented Aug. 28, 1973
3,754,333
14 Sheets-Sheet 6
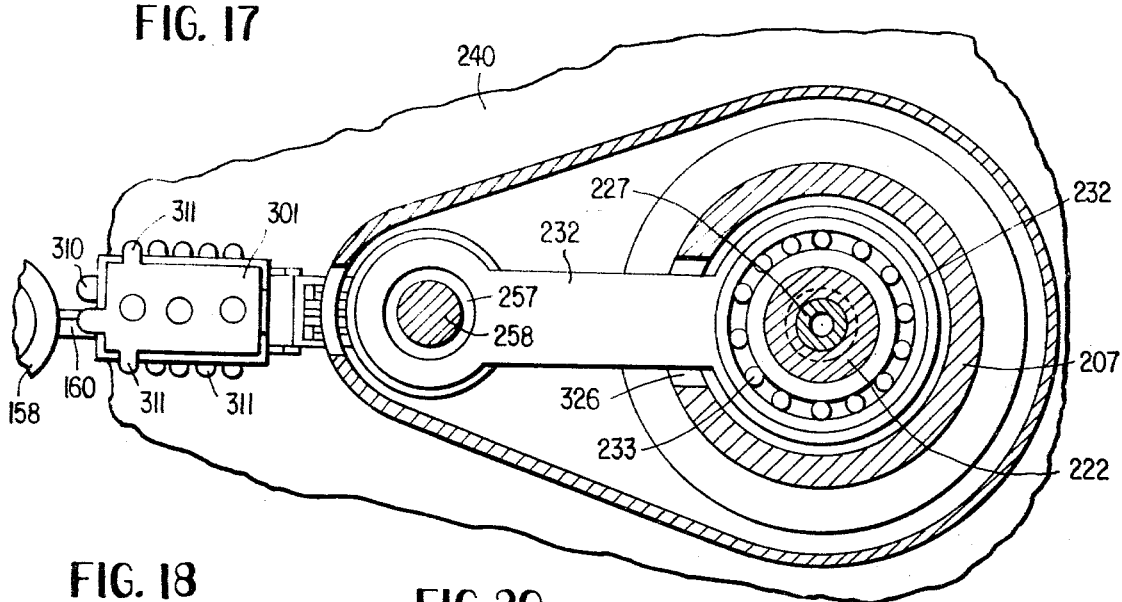
FIG. 17
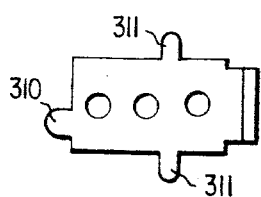
FIG. 18
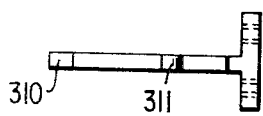
FIG. 19
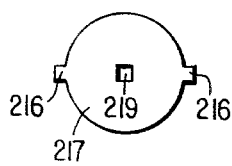
FIG. 20
FIG. 21
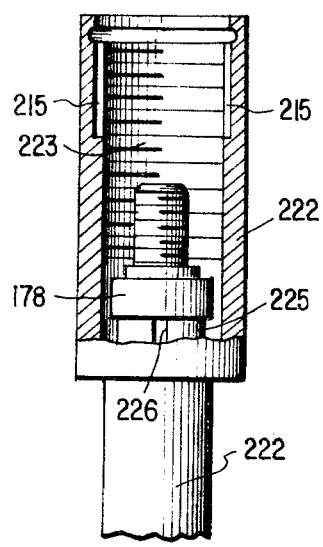
FIG. 22
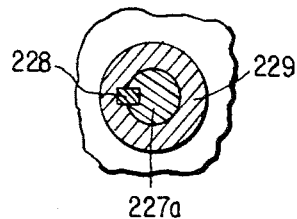
FIG. 23
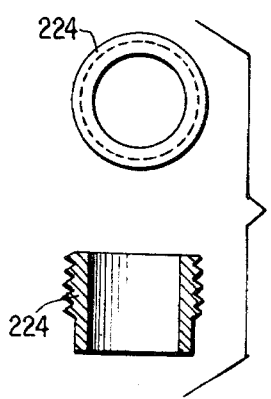
FIG. 24
INVENTOR.
LUDWIG F. PERWAS

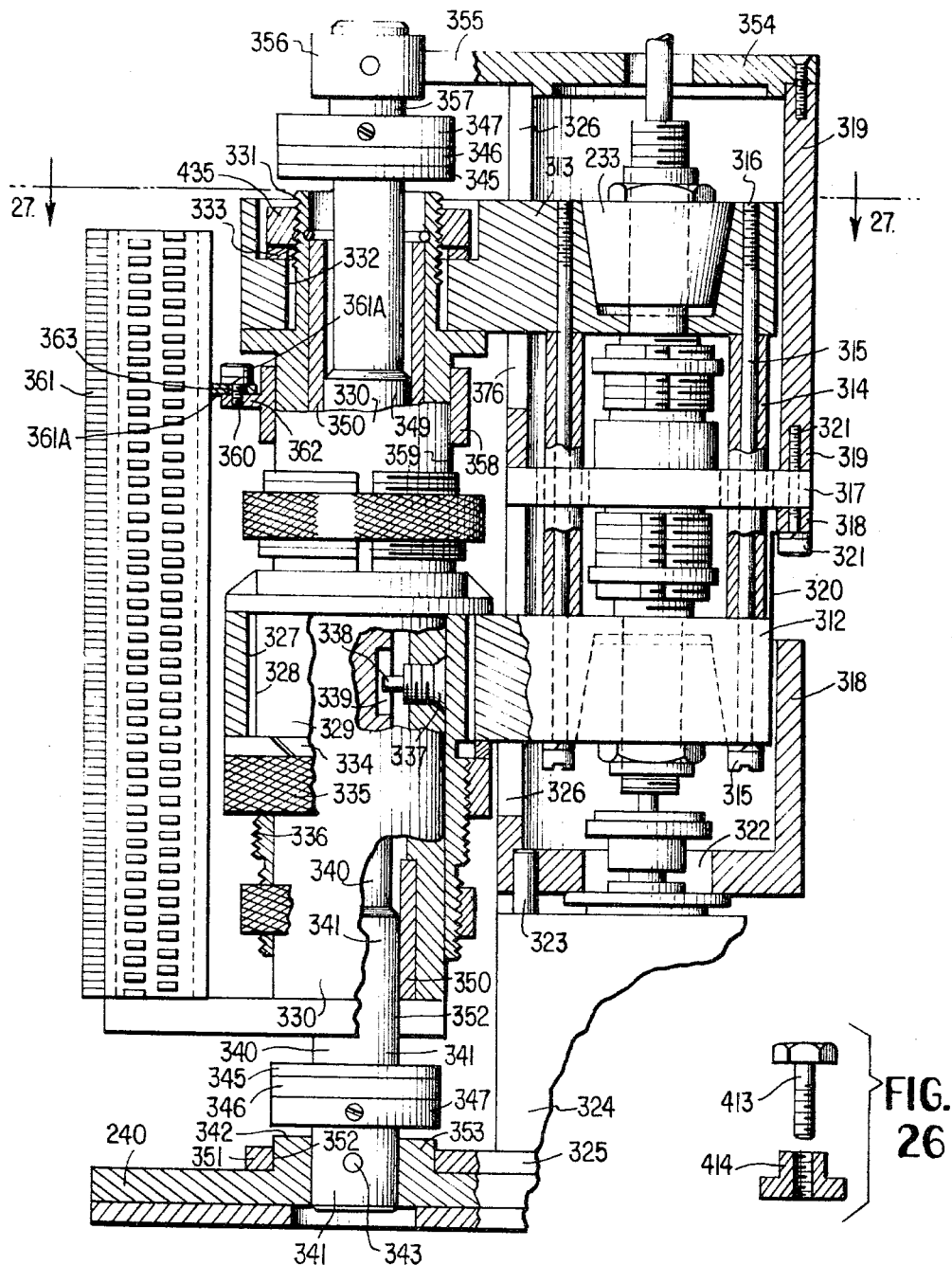

Patented Aug. 28, 1973

INVENTOR.
LUDWIG F. PERWAS

INVENTOR.
LUDWIG F. PERWAS

INVENTOR.
LUDWIG F. PERWAS

INVENTOR.
LUDWIG F. PERWAS

Patented Aug. 28, 1973
3,754,333
14 Sheets-Sheet 14
FIG. 38
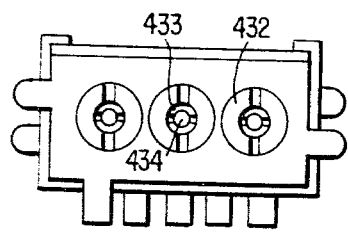
FIG. 39
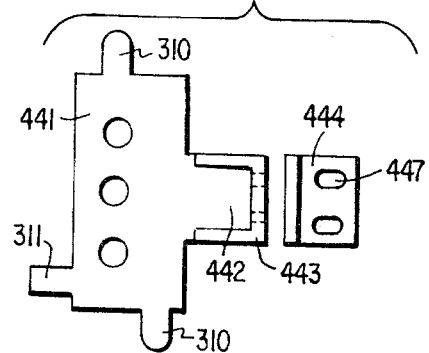
FIG. 40
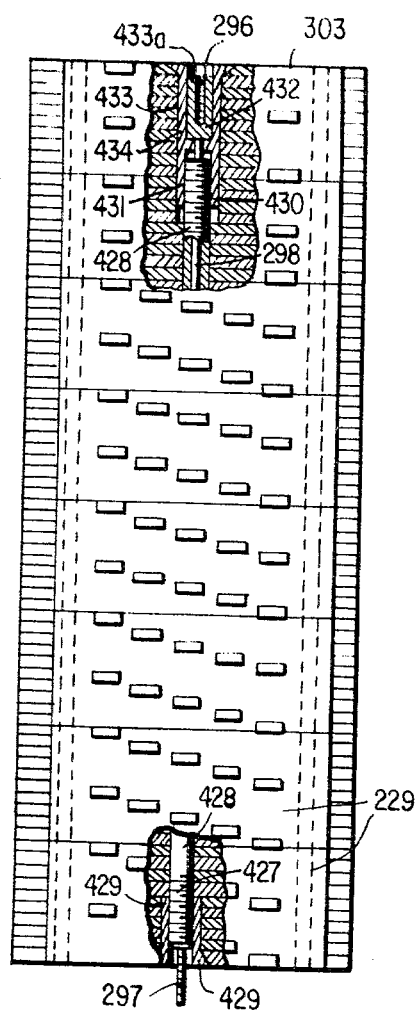
FIG. 41
FIG. 42
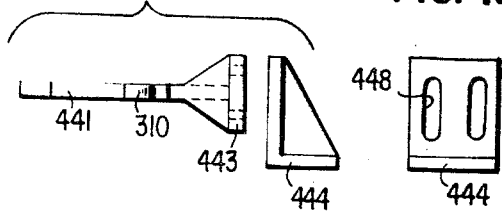
FIG. 43
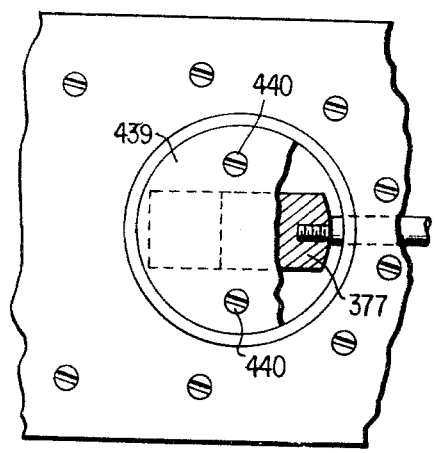
INVENTOR.
LUDWIG F. PERWAS

SCRIBER SETTING HEIGHT GAGE

This invention is an improvement over the height gage of my U.S. Pat., No. 3,180,029 issued Apr. 27, 1965 and a continuation in part application of my patent application Ser. No. 501,220 filed Oct. 22, 1965 now abandoned.

An important object of this invention is to eliminate the manipulating extension parts and simplify the securing means of the multiple gage stack of U.S. Pat. No. 3,180,029 thereby resulting in a more economical device.

Another important object of this invention is to provide a construction more suitable to the operation of a scriber setting means.

A further important object of this invention is to make it easier to reach the manipulating positions of the rotatable micrometer thimble when the gage block stack or column is stacked several multiple stacks high.

Still another object of this invention is instead of utilizing 40 threads to an inch for the micrometer threads, this inter-connected column construction and combination of parts permit ten threads to the inch to be used, while allowing the diameter or width of the under-surface or over-surface gage blocks to be much smaller than those engaging the micrometer lifting mechanism in my U.S. Pat. No. 3,180,029 and still retain the gage stack multiple gage block extension feature.

Still a further important object of this inventive extension construction is to provide a suitable structure for a micrometer thimble with its circumference graduated to one hundred thousandths (.001) by ten thousandths of an inch (0.0001), thereby permitting a much larger graduated thimble for one or 10 turns readings of a 10 pitch thread.

With the above and other objects and advantages in view, the invention consist of the novel, new and unique construction more fully hereinafter described, claimed and illustrated in the accompanying drawings.

Figures 14, 15:
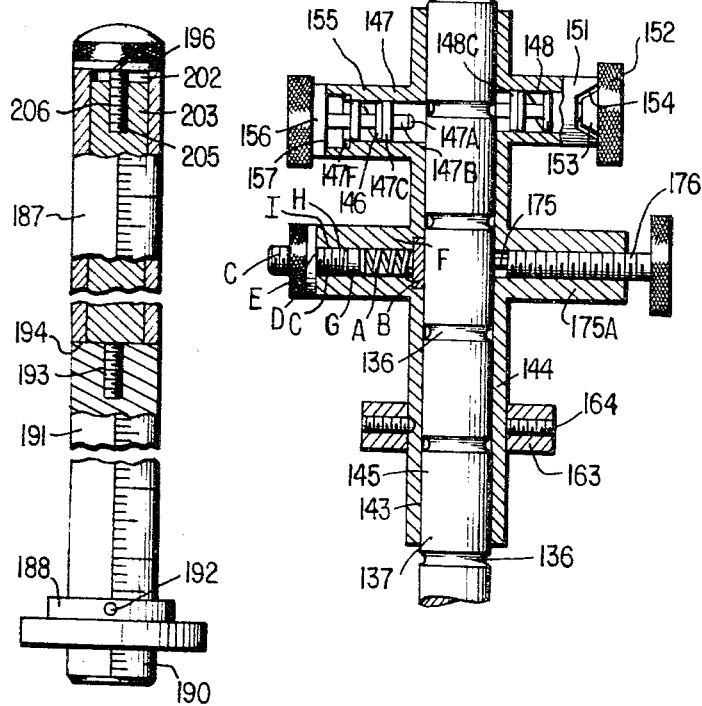

FIG. 14 is an enlarged sectional view of the scriber setting slide element 144 illustrating several important features such as the detent mechanism with parts 146–147–156–etc., the knurl lockscrew 121, the pressure gib with parts A-B-C-D-E-F-G-H-I and the stop plate 163.

FIG. 15 is an exploded plan and sectional view of the detent mechanism parts.

Figure 1:
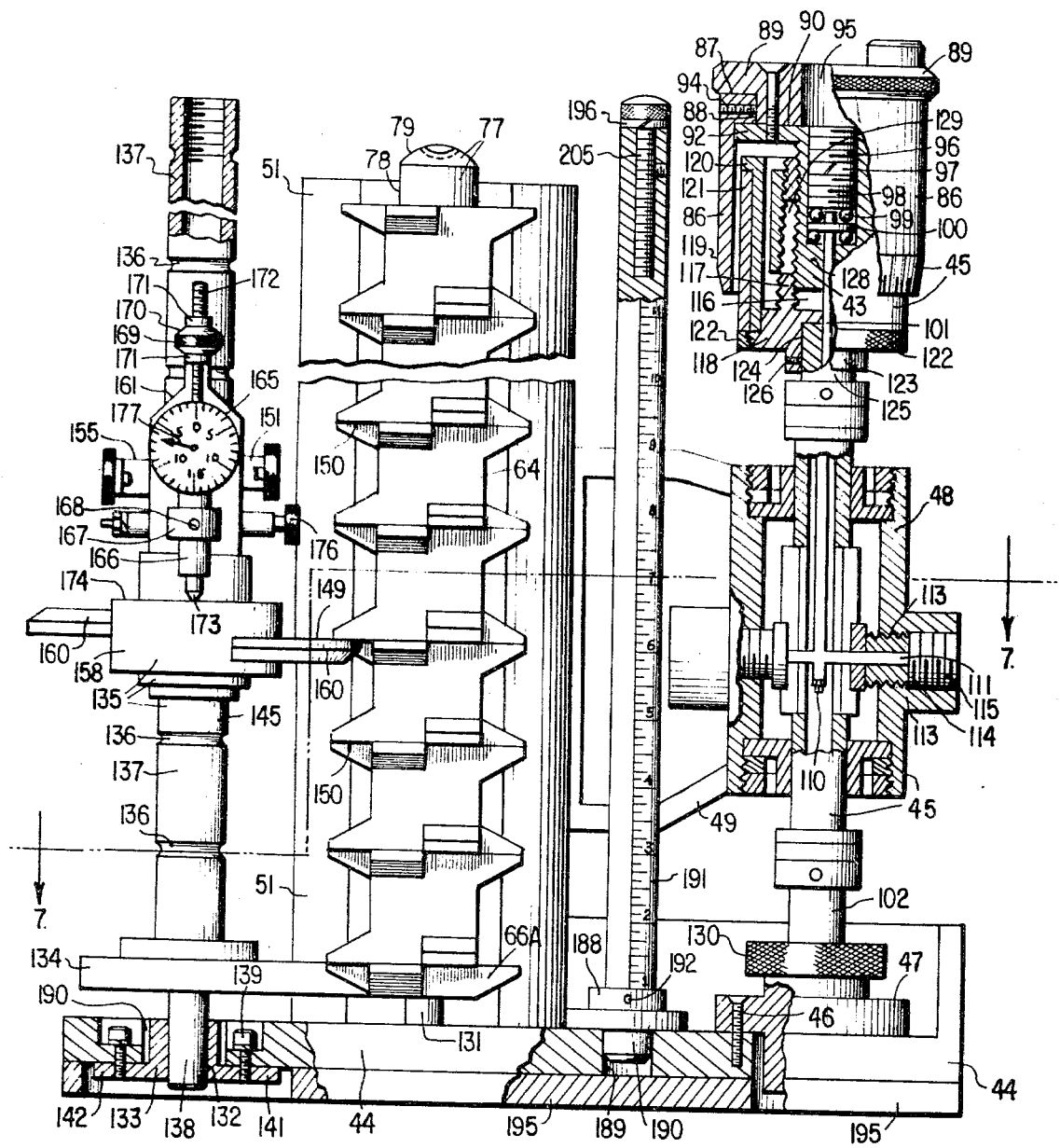
FIG. 1 is a front partial plan and sectional view of one of the devices shown in my pending patent application Ser. No. 501,220, filed Oct. 22, 1965.
Figure 16:
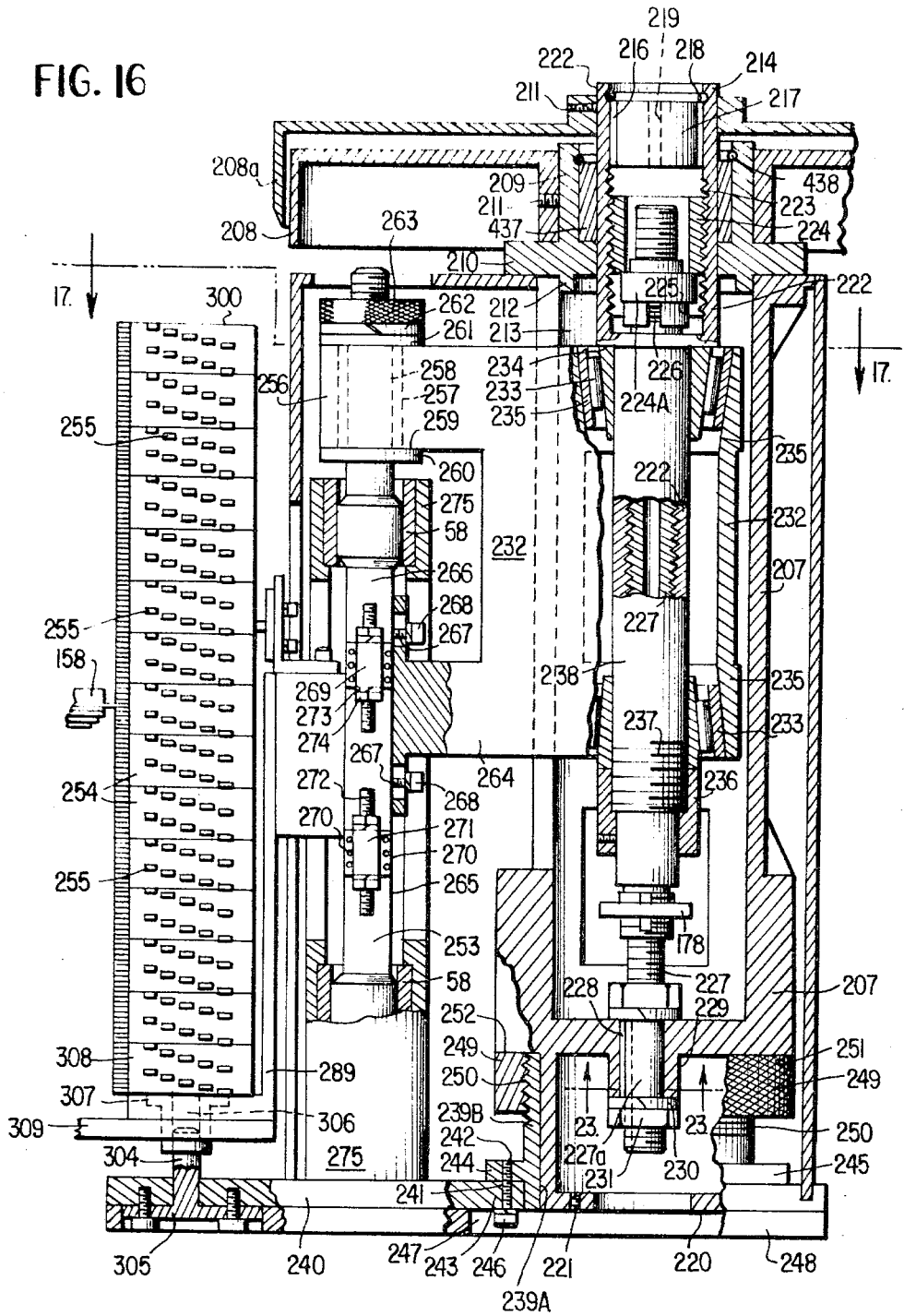

FIG. 16 is a front partial sectional view of a modification of the device shown in FIG. 1 illustrating a stack of unique gage blocks suitable for a one hundred thousandths thickness.

FIG. 17 is a cross-sectional view taken along the line 17—17 of FIG. 16.

FIG. 18 is a top plan view of the gage block shown in FIG. 16 gage stack having a special construction for securing the said gage stack firmly in position, FIG. 19 is a lateral view of FIG. 18.

FIG. 20 is a top plan view of an auxiliary drive element which is utilized when the device in FIG. 16 is provided with motorized means.

FIG. 21 is a view as shown in FIG. 16 or a front view of FIG. 20.

FIG. 22 is an upper partial view of the micrometer lift element less the auxiliary drive element.

FIG. 23 is a cross-sectional view taken along the line 23—23 of FIG. 16.

FIG. 24 depicts a top and front view of an adjusting screw element shown in FIG. 16.

FIG. 25 is a front view of a modification of the device shown in FIG. 16 showing the slide element of said FIG. 16 to be stationary and the stationary column to be the sliding element to which is attached the basic gage stack and micrometer lift bars.

FIG. 26 is a view of a standard T-slot holding means.

Figure 27:
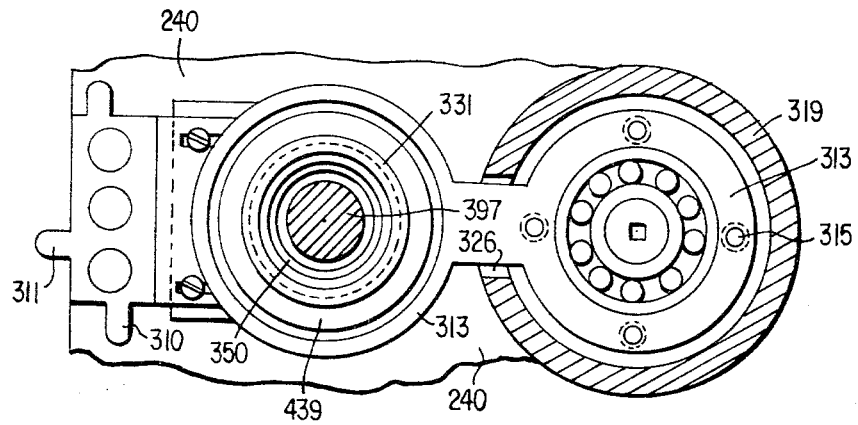

FIG. 27 is a view taken along the line 27—27 of FIG. 25.

Figure 28:
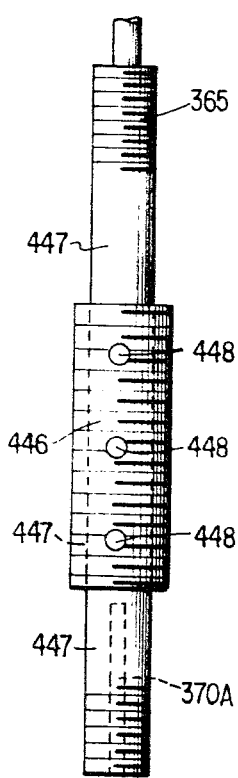
Figure 31:
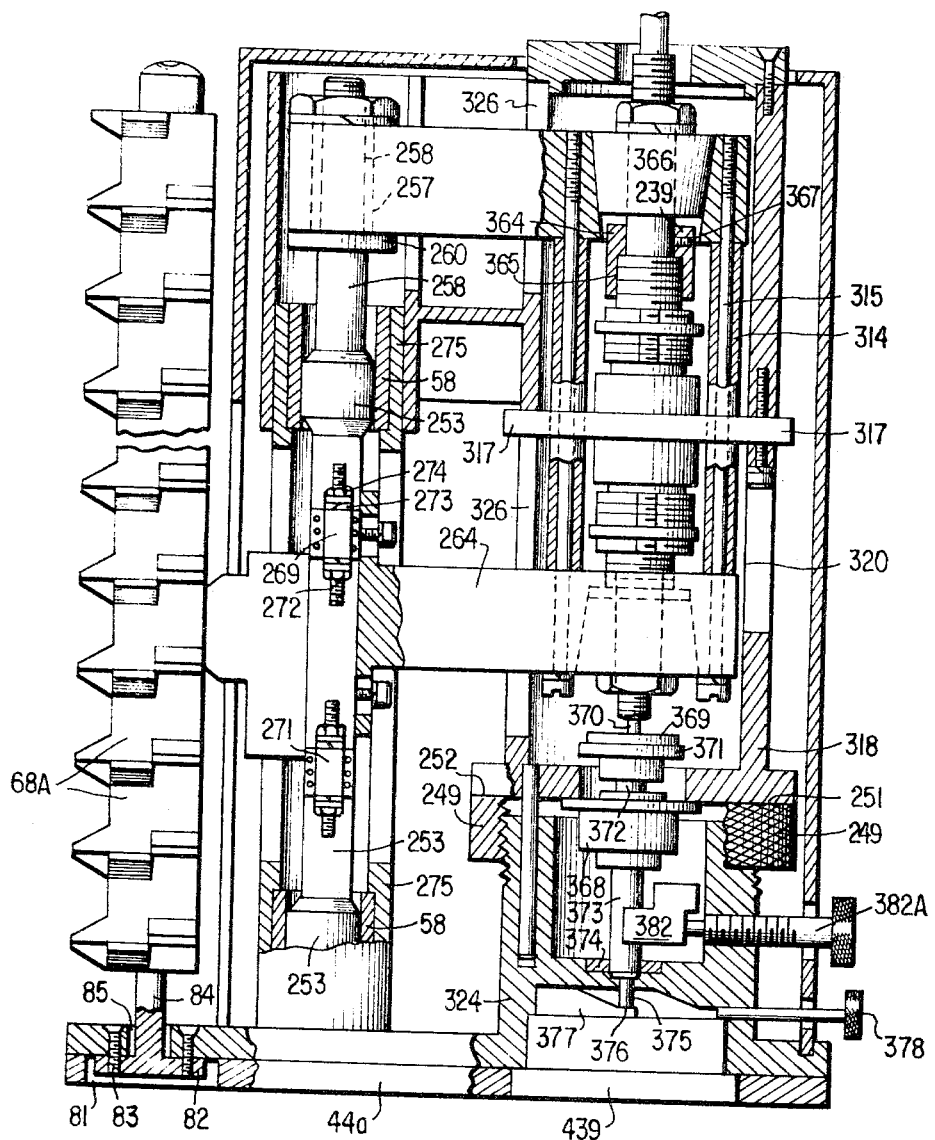
Figure 33:
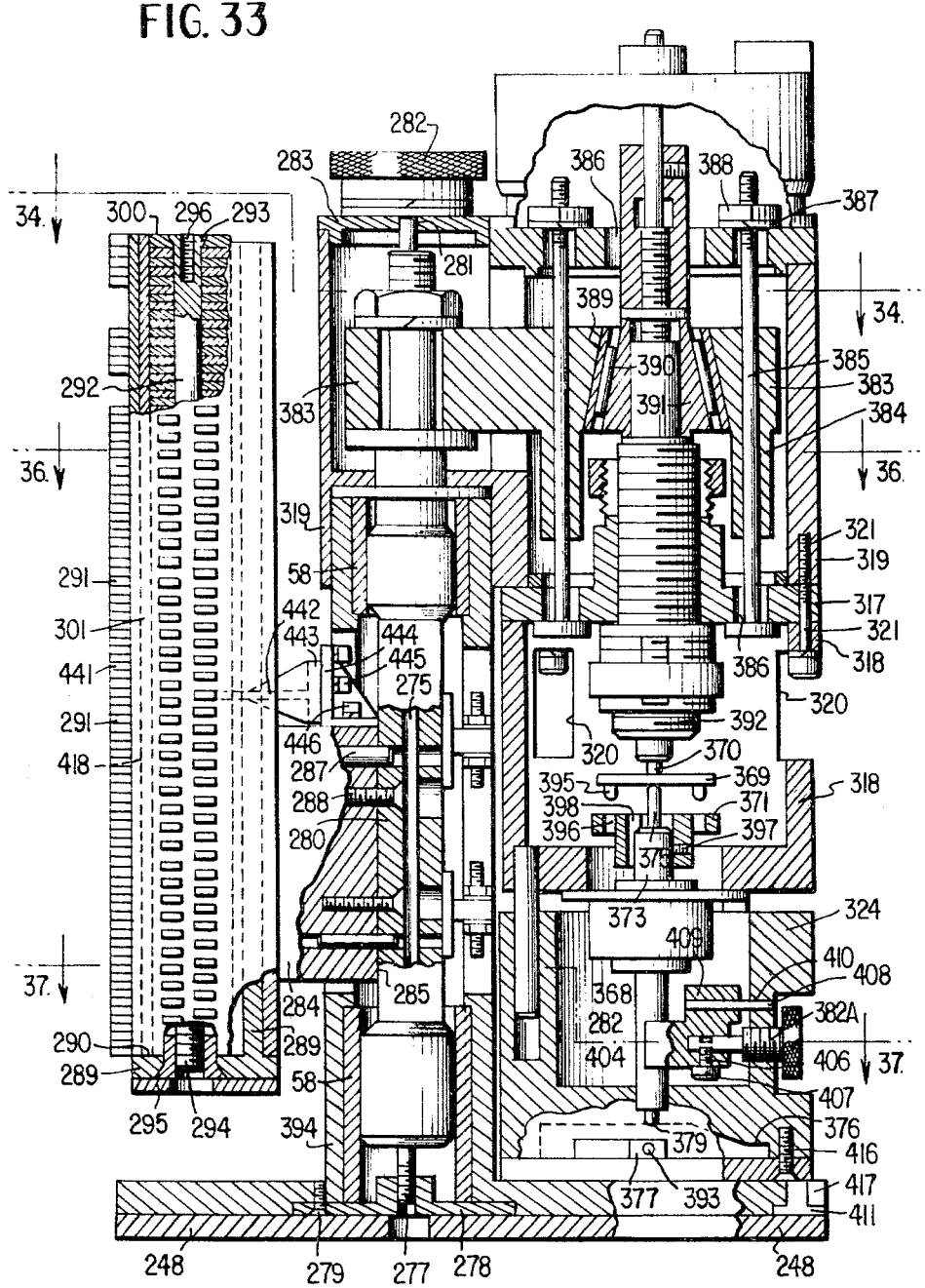

FIG. 28 is an elongated view of the micrometer screw shown in FIGS. 25, 31 and 33.

Figure 29:
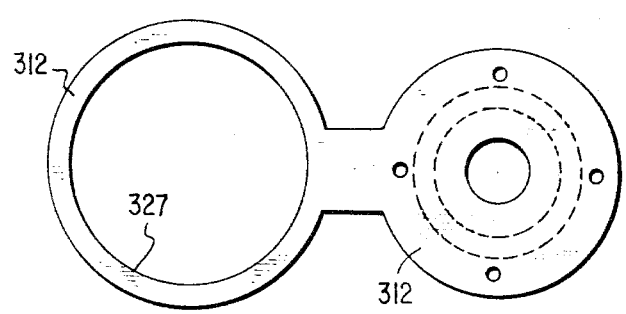

FIG. 29 is a top view of the lower lift bar shown in FIG. 25.

Figure 30:
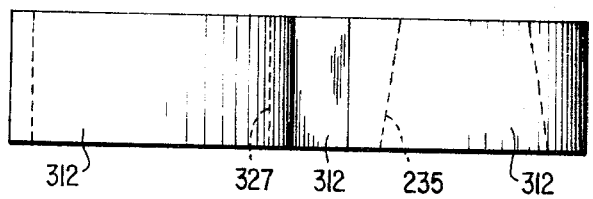

FIG. 30 is a front view of FIG. 29.

FIG. 31 is a front view of a modification of the device shown in FIG. 16 illustrating the motor means, motor actuating cam means, clutch means and special micrometer screw securing and adjusting means.

Figure 32:
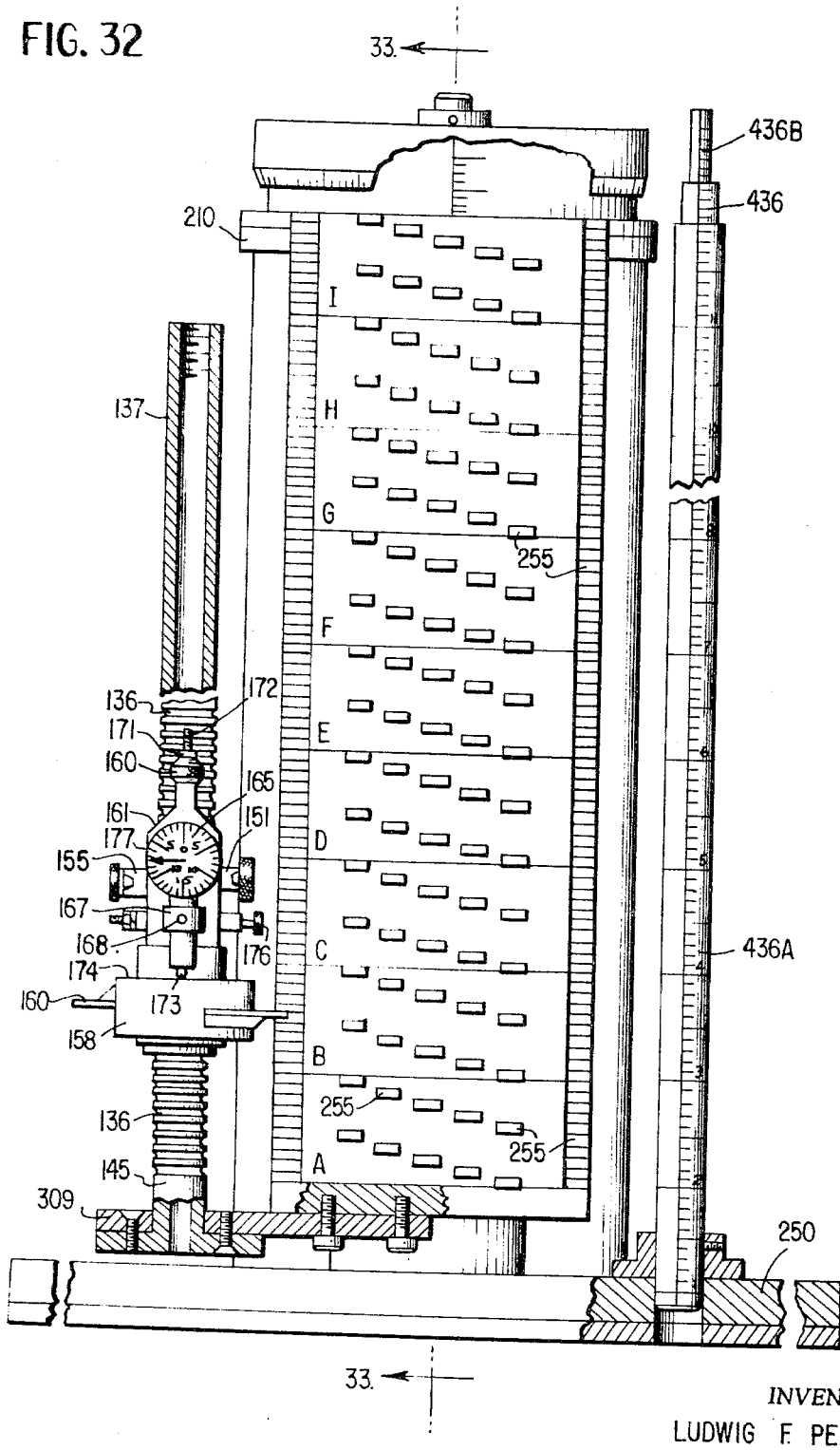

FIG. 32 is a modification of the other mentioned devices consisting of the new one hundred thousandths gage blocks, single lift bar means, scriber setting means, telescoping scale means and adjustable micrometer column for choosing a suitable operating position.

FIG. 33 is a a sectional view taken along the line 33—33 of FIG. 32.

Figure 34:
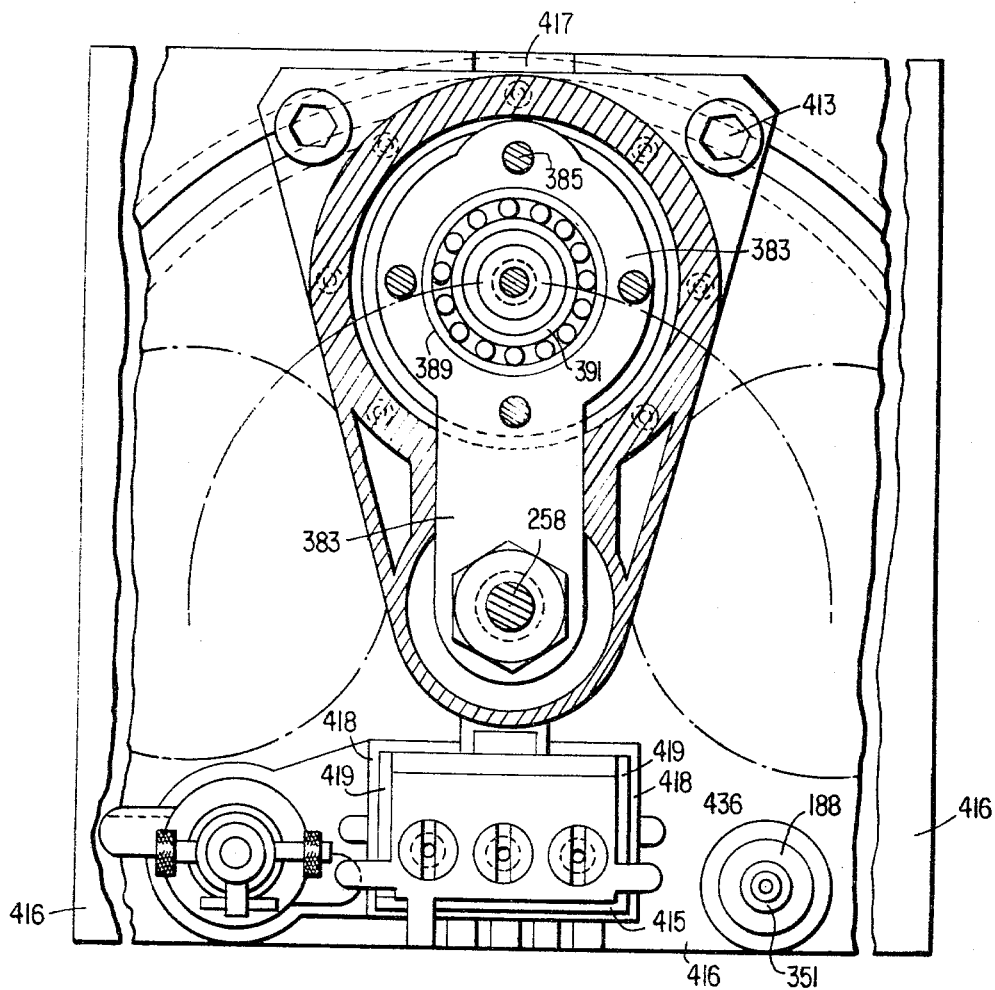

FIG. 34 is a cross-sectional view taken along the line 34—34 of FIG. 33.

Figure 35:
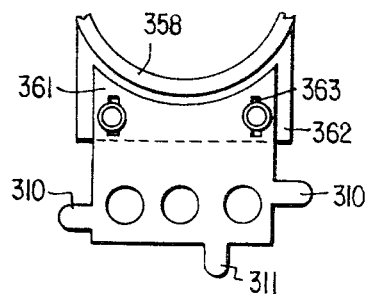

FIG. 35 is a top view of the gage stack upper securing means.

Figure 36:
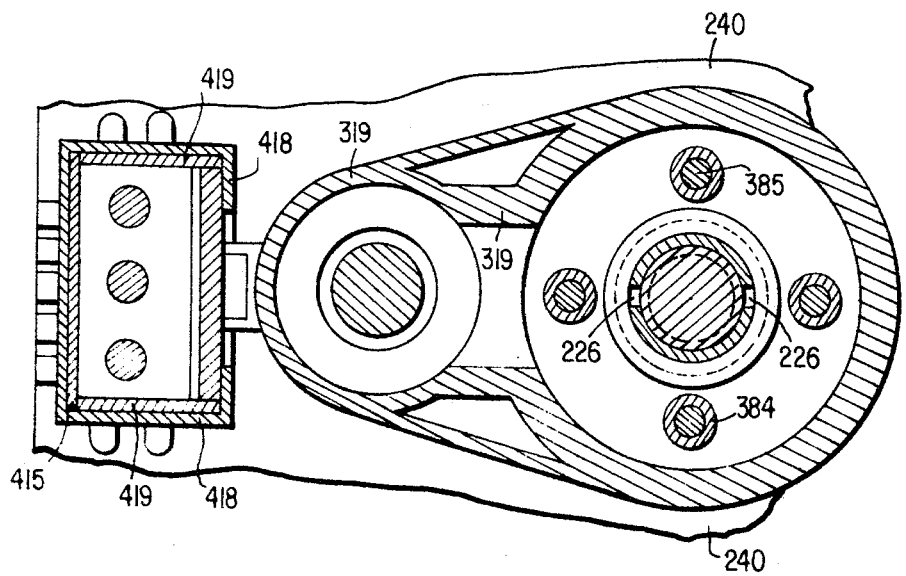

FIG. 36 is a partial cross-sectional view taken along the line 36—36 of FIG. 33.

Figure 37:
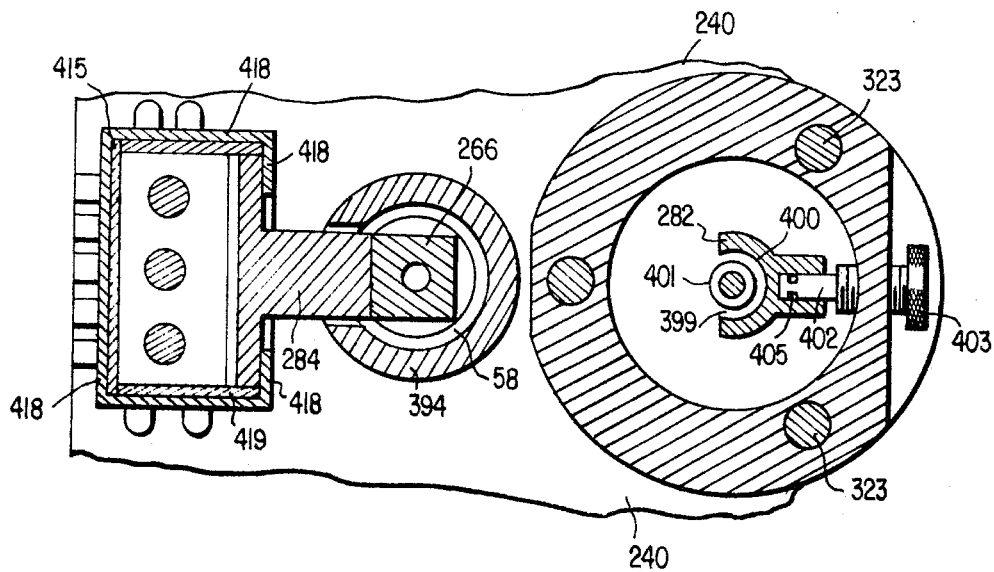

FIG. 37 is a partial cross-sectional view taken along the line 37—37 of FIG. 33.

FIG. 38 is a top plan view of the multiple gage stack shown in FIG. 40.

FIG. 39 is a top plan view of the special upper securing gage block 441 and angle retainer plate 444 of FIG. 33.

FIG. 40 is a multiple gage stack illustrating the new one hundred thousandth gage blocks.

FIG. 41 is a lateral view of FIG. 39.

FIG. 42 is a backview of the angle retainer plate.

FIG. 43 is a bottom view of the micrometer column illustrating the cam actuating means structure.

Referring to FIG. 1 through 15 the device consist of a stationary base 44 having a micrometer column 45, somewhat similar to the device depicted in the previous mentioned U.S. Pat. No. 3,180,029, less the gage rings or blocks, mounted by a plurality of screws 46 passing through holes in the adapter 47 to engage threaded bores in said base 44 which also has integrally attached to a micrometer slide tube 48 a lift bar 49.

The opposing unattached side of the lift bar 49 passes through a slot 50 that is approximately midway between the ends of an elongated support tube 51 and is secured through the assembly slot 52 by dowel pins 53 and the socket screws 54 to the relative precision face 55 of the elongated reduced square center-portion 56 of the support shaft 57 which has precision diameters at its extreme ends 57 that engage solid state bearings 58 that are press fitted in the ends of a rigid support column 51 that is integrally attached to the said base 44.

A basic gage stack lift bar 60 having an elongated narrow lateral face 61 is aligned and secured through the assembly slot 62 by dowel pins 53 and socket screws 54 to a relative precision face 55 which is at 90° to the precision face 55 and integrally attached to the said gage lift bar 60 is a projected portion 63 that is integrally attached to a lift gage block 64 having a center through bore 65 for assembly purposes.

A partial gage block 66A with a non-projected gage side 66 and an elongated shaft 67 upon which is stacked individual similar cross-sectional gage blocks 68 before said shaft 67 engages the said bore 65 of the lift gage block 64 on which is further stacked a sufficient number of gage blocks 68 to complete the basic gage column 68A, The upper threaded end 69 of the said shaft 67 passes through a lockwasher 70, a flat washer 71 having their outside diameters 72 and 73 set in a counter bore 74 of the upper face 75 of the uppermost gage block 76. A threaded cylindrical multiple stacking alignment nut 77 having precision alignment diameter 78 and non-parallel surface 79 engaging said threaded end 69 of the shaft 67 thereby securing the basic gage block stack firmly together forming a basic gage block column 68A. In FIG. 31 below the gage column 68A in the wear plate 44A is a counter bore 81 receiving a flange 82 that is secured by a plurality of screws 83 and having an integral auxiliary alignment shaft 84 passing through a clearence bore 85 and engaging an elongated center precision bore in the shaft 67.

The top of the micrometer device in FIG. 1 has a graduated thimble 86 held adjustably in place by the shoulder 87 of the reduced diameter 88 of the manipulating knob 89 and the upper face 90 of flange 92 of the micrometer screw 93 is secured in place by the set screw 94 bearing against the said diameter 88 and the manipulating knob 89 is provided with a clearence bore 95 to allow for the adjustment of the sub-assembly of the micrometer screw 93 by a retaining assembly consisting of a set screw 96, a split lockwasher 97 that locks in position the spacing set screw 98 which holds the thrust ball bearings 99 and flange 100 of lift shaft 101 rotatably in place.

Figure 2:
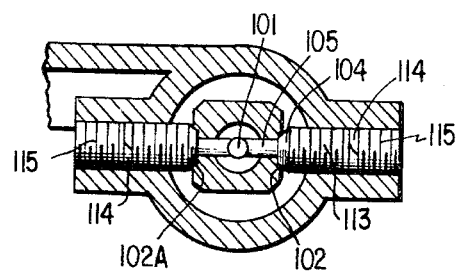
FIG. 2 is a partial cross-sectional view of a unique alignment construction of a vee-slide lift mechanism of the micrometer column of FIG. 1.
Figure 3:
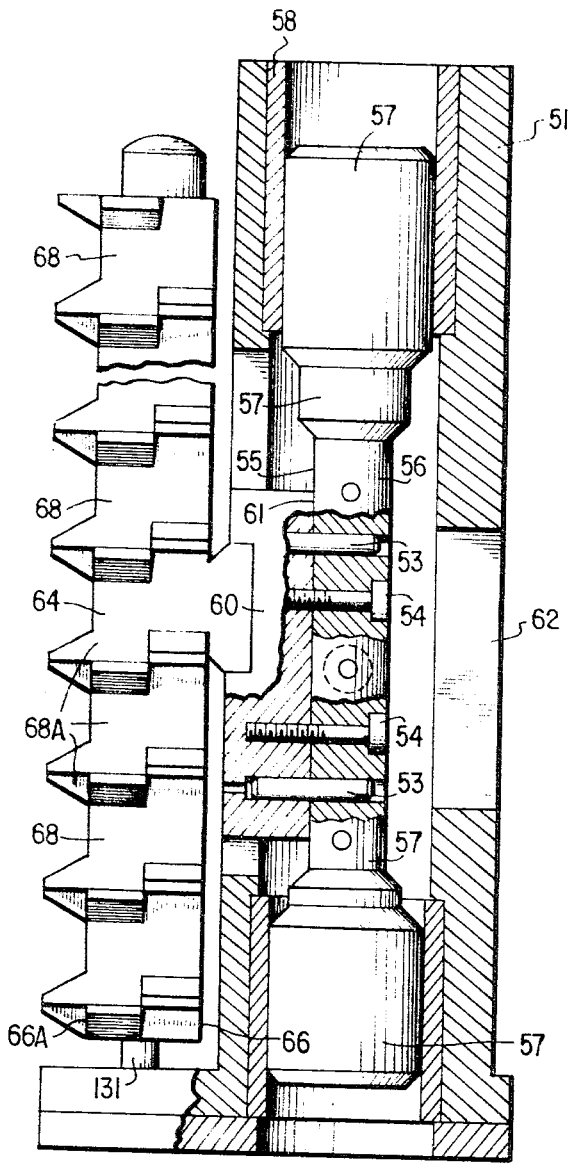
FIG. 3 is a cross-sectional view of the device taken along the line 3—3 of FIG. 8.
Figure 4:
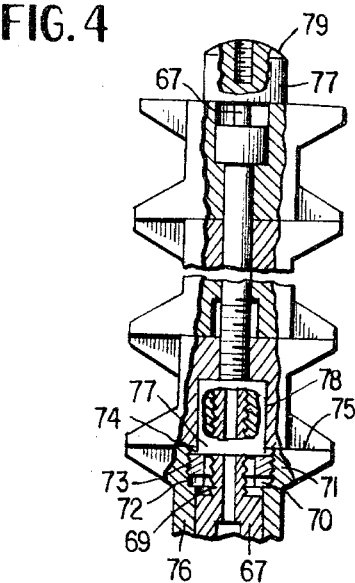
FIG. 4 is a partial sectional view of the most upper gage block of the basic gage column with a multiple gage block stack mounted on the upper gage surface of said gage column and firmly secured in place by a unique dual bolt construction.
Figure 5:
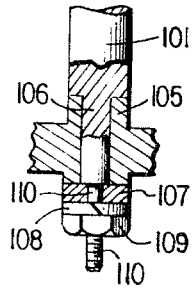
FIG. 5 is an enlarged partial sectional view of the lift bar means within the micrometer linear structure 45 and the micrometer slide tube 48.
Figure 6:
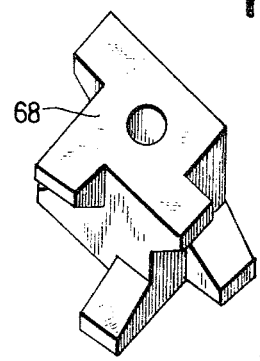
FIG. 6 is an isometric view of the gage block depictee in FIGS. 1, 3, 7, 8 and 31.
Figure 7:
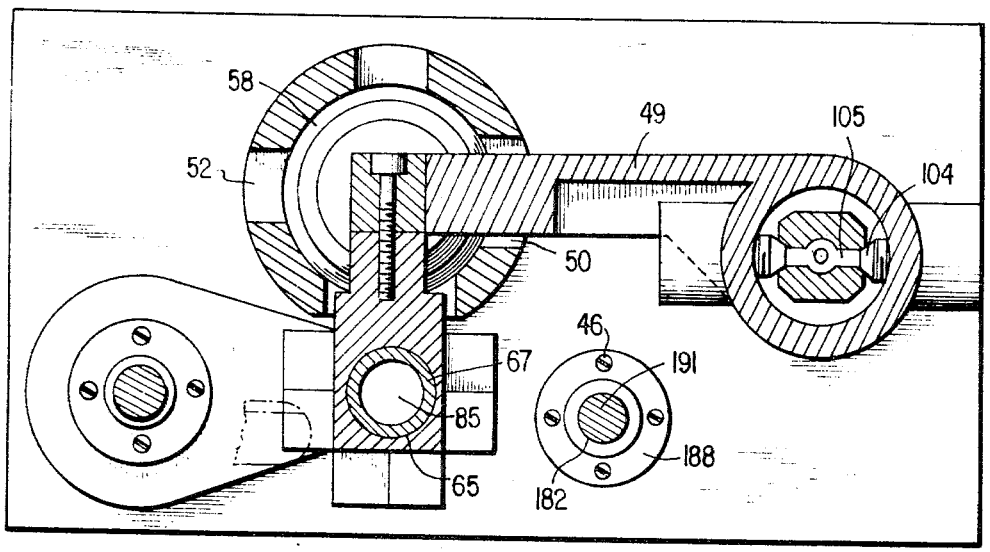
FIG. 7 is a cross-sectional view of the device taken along the line 7—7 of FIG. 1.
Figure 8:
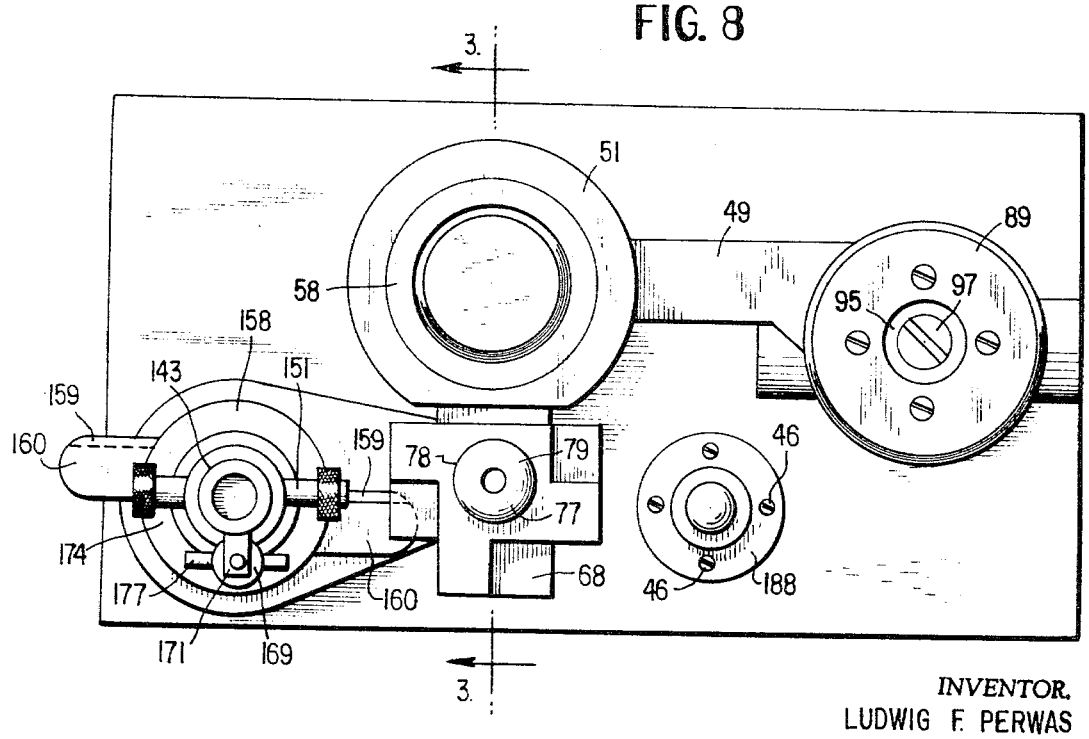
FIG. 8 is top plan view of the device, illustrating the cross-sectional compactness.
Figure 9:
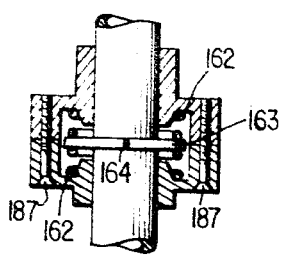
FIG. 9 is a lengthwise sectional view at 90° from the position shown in FIGS. 1 and 32 thereby omitting the scriber setting arms for a clearer illustration of the spring actuating mechanism and securing means.
Figure 10:
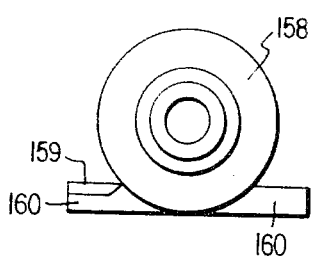
FIG. 10 is a bottom view of the scriber setting means.

The vee-lift mechanism shown in FIGS. 1, 2 and 7 consist of a vee-way slot 102A in the support tube 102 engaging a vee-key 104 that engages a lift bar 105 which is secured to the reduced diameter 106 of the lift shaft 101 by a washer 107, a lockwasher 108 and nut 109 engaging a further reduced diameter 110 of the said lift shaft 101. The ends 111 of the lift bar 105 engages a bore 112 of an adjustment screw 113 that bears against the vee-key 104 maintaining it 104 with a sliding fit in the said vee-way slot 102A. A lockwasher 114 and set screw 115 secures the adjustment screw 113 firmly in place.

Referring to the micrometer mechanism the micrometer screw 93 engages the inside threads 116 of the double threaded wall 117 of a micrometer housing 118 and within the top of the micrometer screw 93 is the previous mentioned rotatable ball bearing loaded lift rod 101 and adjusting means. The micrometer housing 118 has an outside wall 119 with flange 120 against which one end of a graduated barrel 121 seats. The barrel 121 is secured in place by a threaded knurl lock ring 122 engaging a corresponding threaded end of the housing 118 outside diameter of the wall 119. The lower end of the housing 118 has a hub 123 with a precision bore 124 that engages a corresponding precision diameter 125 of the support tube 102 upper end and is secured in place by the set screw 126. The outside tapered threads 127 of the double threaded wall 117 engages corresponding tapered threads of an adjusting bushing 128 which when further engaged to remove the play between the outside micrometer screw thread and the inside thread of the double threaded wall 117 depresses the play area enclosed by the bushing 128 and defined by the slots 129 in the said double threaded wall 117.

The threaded knurl ring 130 engages the threaded lower end of the support tube 102 and by rotating it 130 clockwise raises the micrometer column's slide tube 48, slide element 57 and basic gage column 68A or when it 130 is rotated counterclockwise the gage column is lowered permitting the gage blocks to be properly set to a unit measurement above the working surface upon which the device is being utilized by adjusting the micrometer thimble 86 or graduated barrel 121.

An integral shaft portion 131 of the partial gage block 66a engages a corresponding alignment bore 132 of the bushing 133 while on an integral extended portion 134 of the said block 66a is mounted a scriber setting means 135 that engages the full 1 inch measurement grooves 136 of the column 137. A shaft 138 engages a corresponding bore 132 of the bushing 133 which is held in place by the socket screws 139 threaded ends passing through adjustment slots 140 and engaging threaded bores 141 in the flange 142 of the bushing 133. The upper end of the shaft 138 engages a corresponding bore in the unit measurement column 137.

Two opposing off-set detent mechanism consisting of a housing 151 or 155 containing a detent 147 or 148 having a radius 147A or 148A at one end followed by a short diametrical portion 147B or 148B engaging an integral flange portion 147C or 148C which in turn is integrally attached to a rod-like portion 147D or 148D that engages a compression spring 146 enclosed and held in place by the rigid washer 147E or 148E and lockring 147F or 148F. A thread 147G engages a threaded bore 152A of a knurl knob 152 for the manual operation of the detents.

A housing F that is an integral part of the slide element 144 contains a soft metal pad B with a compression spring A applying pressure against said pad B and held in place by a spacer G and a set screw C engaging a threaded bore H in the outer end I of the said housing F with a lockwasher D and knurl nut E for locking said set screw C firmly in place. The aforementioned structure prevents the slide element 144 from dropping to the bottom of the shaft 137 which may result in damage to the scriber setting arms or gage block projected gage surfaces. If both detents 147 and 148 are dis-engaged and the user loses their grip on the slide element 144 unit, the scriber setting mechanism would drop towards the bottom with a high chance of the scriber setting arms crashing into the gage block measuring surfaces.

In FIG. 14 an inside thread of the integral base 176A of the slide element 144 engages a threaded diameter of a lockscrew 176 having a reduced diameter 175 that secures or releases the said slide element 144 in relation to the utilizing of the unit grooved shaft 137.

A precision bore 143 of a cylindrical slide element 144 engages the corresponding outside diameter 145 of the unit measurement column 137 so that one of the two spring 146 loaded detents 147 or 148 may engage a full inch unit ring groove 136 which will apply tension to the projected over-surface arm 160 when engaging an under-surface projected measuring surface 150 of a gage block 68 by engaging the detent enclosed in the housing 151 by releasing the the knurl knob 152 allowing its 152 tapered sides 153 to engage the corresponding tapered groove 154 of the housing 151, whereas the detent in housing 155 is in an open position as it was pulled all the way out and rotated ninety degrees and then released allowing the flat bottom surface 156 to seat upon the outer face 157 of the housing 155. This arrangement permits only one detent at a time to be utilized. The over-surface arm 149 is engaged by first assuring the disengagement of the relative under-surface detent 147 and engaging the relative over-surface detent 148 and then rotating the housing 158 in a counterclockwise direction until the engaging taper 159 of the scriber arm 160 encounters the under-surface 150 of the gage block 68 gently urging the corresponding surfaces 149 and 150 to engage. The detents centers according to the dial indicator 161 are spaced 0.007 apart so that if either one of the detents are engaged the indicator will read 0.007 thereby allowing a free movement of plus or minus 0.007 from the gage surfaces of the blocks 68 for the setting of the projected under-surface and projected over-surface of the floating housing 158 which contains dual opposing springs 162 bearing against both faces of the circular stop plate 163 that is secured to the cylindrical slide 144 by the set screw 164.

A dial indicator 161 with a tension range of 0.100 and a balanced dial face 165 with a range of plus or minus 0.015 is secured to the cylindrical slide 144 after the diameter 166 engages a corresponding bore in the extended slide member 167 by the set screw 168 after it 161 is adjusted by the knurl nut 169 mounted in a slot 170 formed by the two upper extended member 171 and engaging the threaded shaft 172 as the ball point 173 is adjusted to bear against the upper surface 174 of the floating housing 158.

To use the scriber setting mechanism the micrometer scales are set according to the height of the line to be scribed is above the surface plate and the projected under-surface 150 of the gage block 68 and the over-surface 149 of the scriber setting arm 149 which moves along with the gage column and is relatively set to the unit inch of the said gage column measuring surfaces is selected, as in FIG. 1 the over-surface 149 engages the under-surface 150 when the relative detent engages the the appropriate unit inch groove 136 of the unit measurement column upon which the cylindrical slide 144 is secured by the reduced diameter 175 of the knurl lockscrew 176 and the indicator needle 177 position is checked to see if it is on the dial marking 0.007. The projection arm 160 is gently released to assure maintaining the precision setting and a scriber of a standard height gage is gently brought in contact with the over-surface 149 and adjusted until the reading is similar (0.007) to what the reading was when the arm over-surface 149 was just before it was released (0.007). The height gage lockscrew is engaged and the height gage is carefully slid over to scribe a line on the workpiece.

Figure 11:
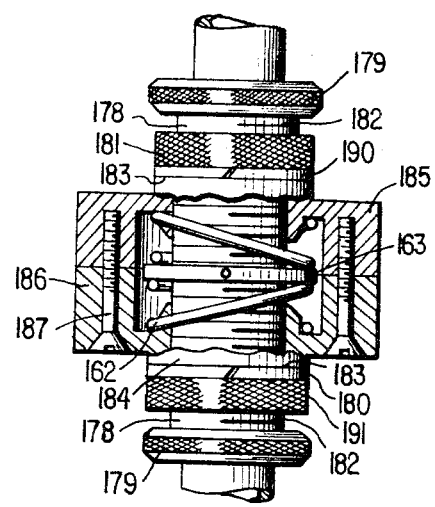
FIG. 11 is a similar view of FIG. 9 except that it also illustrates spring adjusting means.
Figure 12:
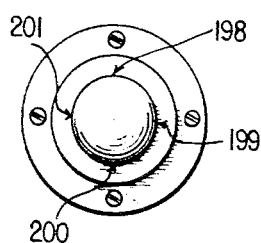
FIG. 12 is a top view of FIG. 13.
Figure 13:
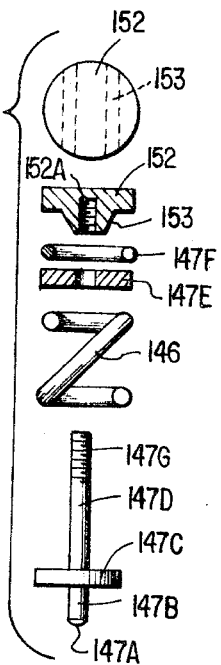
FIG. 13 is an elongated view of a basic scale means and a multiple graduated extension scale.

In FIG. 11 is a modification of the scriber setting mechanism illustrating a dual adjustment screw 178 for adjusting the spring pressure on either side of the stop plate 163 to regulate the centering of the detents 147 and 148 in reference to unit gage surfaces of the gage column. A knurl flanged end 179 is gripped for increasing or decreasing the spring pressure and a split lockwasher 180 and threaded knurl ring 181 engaging the outside threads 182 of said adjustment screw 178 securing it 178 firmly in place by applying pressure to the upper face 183 of the threaded hub 184 of the floating housing 158, which consist of two halves 185 and 186 that are firmly secured together by the flat head screws 187.

Attached to the stationary base 44 in the same manner as the adapter 47 is an adapter 188 having a precision bore 189 engaging a precision diameter 190 of a basic scale rod 191 that is adjustably secured to said adapter 188 by a set screw 192. The upper end has a bore 193 and an upper precision face 194 that is flat and parallel to the bottom surface 195 of the device and the thread of the said bore 193 is square to the precision face 194.

An extension scale rod 197 having a plurality of individual vertical graduated alignment scale lines in conjunction with varying graduated consecutive fractional scale ranges 198, 199, 200 and 201 is securely mounted on the upper precision face 194 by its bore 202 engaging an elongated diameter of an extension scale rod support 203 which has a reduced threaded diameter engaging the threaded bore 193, and after the desired scale range is aligned a threaded end 205 of a knurl screw engaging a split lockwasher 196 and a threaded bore 206 in the upper end of the scale rod support 203.

The first number of each of the four scale ranges designates the uppermost full inch height of the precision surface upon which the graduated scale rod sets, while the last number is one less that the actual height the gage column has been extended. The basic gage numerical graduation of the scale rod full inches is also one less than the actual basic gage column height. The multiple gage extension stacks although shown here to be 6 inches in length may vary according to the lifting power of the device.

The first stack range numbered 12 to 18 inches vertically positioned on the plurality extension range rod 197 is represented by the numeral 198, the second stack range of 19 to 24 by the numeral 199, the third stack range of 25 to 31 by the numeral 200 and the fourth stack range of 32 to 38 by the numeral 201.

In FIG. 16 is illustrated a modification of the device shown in FIGS. 1, 3, 7 and 8 consisting of a micrometer column 207 having a graduated micrometer barrel 208 secured to an upper diameter 209 of the adapter 210 by the set screw 211, a lower diameter 212 engages the bore 213 in the upper end of the said column 207. A micrometer thimble 208A having its circumference graduated to one hundred thousandths of an inch (0.001) by ten thousandths (0.0001) and secured to the outside diameter 214 by a set screw 211 and within the top slots 215 for receiving the integral keys 216 of the plug 217 which is held in place by the lockring 218 and within the center a square bore 219 for receiving a square shaft of a clutch when this device is used with a motor that would be attached to the face 220 and held in place by the screw holes 221. The upper bore of the micrometer lift shaft 222 has below the plug 217 a threaded hollow adjustment bushing 224 engaging the inside threads 223, applies pressure to the adjustment bushing 224A which in turn by means of its 224 inside tapered diameter engaging the outside tapered diameter 225 that is an integral part of the micrometer lift shaft 222 thereby adjusting the micrometer screw thread play in conjunction with the slots 226 in the tapered diameter 225. The micrometer screw adjustment is the same at the lower end of the micrometer lift shaft except that the tapered diameters are threaded eliminating the need of the said adjustment bushing 224 at this end. A micrometer screw 227 has a keyed 228 nonthreaded diameter portion 227A engaging corresponding a bore in the hub 229 of the lower end of the micrometer column 207 and secured in place by the split washer 230 and threaded ring nut 231. The elongated micrometer screw thread 227 engages the inside elongated thread of the micrometer lift shaft 222 which engages a lift bar 232 by a tapered roller bearing 233 having at the larger end bear against the face 234 at the shoulder of the micrometer lift shaft 222 and engage a bearing bore 235 in the lift bar and at the lower opposing side another tapered roller bearing 233 engaging a bearing bore 235 and an adjustment shouldered bushing 236 engaging a thread 237 of the reduced diameter 238 of the lift shaft 222 and applying sufficient pressure against the adjacent face of the inner race of the tapered roller bearing 233 and said bushing 236 is secured in place by the set screw 237. The reduced diameter 239A of the column 207 engages a corresponding bore in an adapter 239B which is secured to the base 240 by a plurality of screws 241 having their threaded ends 242 pass through an adjustment slot 243 and engaging threaded bores 244 in the adapter flange 245, and the socket head screws 246 are freely located in a recess 247 in the bottom of the wear plate 248. A threaded knurl adjusting ring 249 engages the upper threaded end 250 of the adapter 239 and the upper face 251 bears against the surface 252 of the column 207 and when it 249 is rotated clockwise the column 207 is raised thereby raising the interconnected lift bar 232, slide element 253 and the basic gage column 254 but when the knurl nut 249 is rotated counterclockwise it lowers the micrometer column 207 and its interconnected lift bar 232, slide element 253 and basic gage column 254 with this construction by loosening the graduated micrometer barrel 208 or micrometer thimble 208A the gage blocks 255 can be, if necessary, adjusted to an accurate full inches above the working surface upon which the device is being used.

The upper extended end 256 of the lift bar 232 has a bore 257 freely engaging a reduced diameter 258 of the slide element 253 and abutting against the upper surface 259 of the slide element flange 260 and secured in place by the spacer 261, split lockwasher 262 and threaded ring nut 263. The lower shorter end 264 is secured to a flat surface 265 of the square member portion 266 of the slide element 253 by the threaded ends 267 of the socket screws 268 passing through the adjustment slot and engaging corresponding threaded bores in adjacent portion 266. Adjustment units 269 are secured to the portion 266 by the screws 270 and a threaded bore through the body 271 engaging a threaded shaft 272 which is secured at both ends by a split lockwasher 273 and nut 274. In FIG. 16 a slot in the slide element 253 stationary column 275 with resilient stop pads as shown in FIG. 16 co-acts with the adjustment units 269 to limit the travel distance of the micrometer lift shaft 222, slide element 253 and gage stack 254 to protect said parts 222, 253 and 254 against being damaged. An elongated shaft 276 threaded lower end 277 engages a corresponding threaded bore in an adapter 278 that is secured to the stationary base 240 by the flat head screws 279 and the shaft 276 passing through a corresponding bore 280 within the slide element 253 through a cover plate bore 281 and integrally connected to a knurl knob 282 that secures the cover 283 to the column 275, in the device of FIG. 33 only.

In FIG. 33 a lift bar 284 having a narrow side 285 secured to a flat face 286 of said square member portion 266 by the dowel pins 287 and flat head screws 288. The opposing narrow side of the lift bar 284 has an integrally attached L-shaped gage support 289 including a precision surface 290 that is flat and parallel to the bottom surface of the wear plate 248. Gage blocks 291 are stacked and aligned on the precision surface 290 and secured in place by three bolts 292 with flat head screw type head 293 and a threaded end 294 engaging a flat head screw type nut 295. In the upper end is a threaded bore 296 for receiving the threaded reduced diameter 297 of the multiple gage stack extension bolt 298 that secures the extension gage stack 299 to the upper surface 300 of the basic gage column 301. The head 302 of the extension bolt 434 has a threaded bore 296 for further extending the gage column by adding an extension gage stack 299 to the upper gage surface 303 of the stack 299 shown in FIG. 40 illustrating showing that the gage column 301 may be continously extended. The one hundred thousandths (0.001) gage blocks are made so that when properly assembled a double row of alternating under-surface and over-surface gage surfaces are formed to be used as scriber setting gage surfaces and a tab-like double row of gage surfaces are formed for use with a standard height gage and dial indicator. The one hundred thousandths thick gage blocks allows the obtaining of a dimension reading within one turn of the micrometer thimble when a ten pitch thread is used and results in a great saving of time. A gage column alignment rod 304 having a flange 305 freely engaging a bore 306 in the insert bushing 307 that is held in place by the lower most gage block 308.

A scriber setting unit support plate 309 is attached to the bottom of the L-shaped gage support 289. In FIG. 16 only the position of the support plate 309 is shown and the relative position of the floating housing 158. The scriber setting construction is the same with the exception that support plate 309 is detachable, the annular unit grooves 136 are spaced 0.001 apart instead of 1 inch and the thickness of the ends of the arms is less than one hundred thousandths (0.001) in order to fit between the gage blocks.

FIG. 17 shows the basic gage column 301 having on the short side of the rectangular gage block a double vertical row of gage surfaces 310 on one end and on each of the longer sides a double tab-like row of gage surfaces 311 to an inch which gives the person using this device a choice of keeping the micrometer thimble 208A to the right or to the left or to the rear or at any suitable angle.

The modification shown in FIG. 25 is basically related to the model shown in FIG. 1 but is more related to the model shown in FIG. 16 the tapered bearings 233 are located in two lift bars 312 and 313 that are spaced by the hollow spacing rods 314 and secured by the bolts 315 passing through lift bar 312, the spacing rods 314, and with its 315 threaded end 316 engaging the partially threaded bore of the lift bar 313, forming a rigid dual lift bar. A dual adjustment for the micrometer screw is extended from a micrometer screw support plate 317 which is located between a lower housing 318 and upper housing 319.

The lower housing 318 is cylindrical in cross-section and has access windows 320 to facilitate the securing of the support plate 317 to the upper housing 319 by the socket screws 321 and a center bore 322 for the engaging of clutch means and a bore for receiving a press fitted shaft 323 of the support housing 324 which is secured to the base plate 325 the same as shown in FIGS. 33 and 34. A slot 326 is provided to enable the lift bar 312 to extend through the housing 318 so that the bore 327 can freely engage the diameter 328 of a dual adjustment sleeve 329 for the lift bar 312. The lift bar 313 is secured to the exterior slide element 330 by the threaded diameter 331 freely engaging bore 332 of the lift bar 313 and split lockwasher 333 and nut 435 engaging said threaded diameter 331 to secure bar 313 firmly in place. The split lockwasher 334 and knurl ring nut 335 engaging the threaded diameter 336 secures the lift bar 312 firmly in place. A flat head screw 337 secured in the exterior slide element 330 has a reduced diameter 338 engaging a key way 339 in the stationary column 340 for maintaining the slide element 330 in position when the position of the micrometer column is changed. The stationary column 340 lower diameter 341 partially engages a bore in a hub 342 of the stationary base plate 340 and is secured in place by the tapered pin 343. A stop pad 344 consisting of a rigid washer 345 having cemented to one side a resilient washer 346 and cemented to the opposite side of resilient washer 346 a rigid collar 347 having a set screw 348 for securing the stop 344 in a selected position. The lower diameter 341 and the upper diameter 349 engage solid state bearings 350 that are press fitted within the corresponding lower and upper ends of the exterior slide element 330. In the bottom plate 325 of FIG. 25 is an extention to provide for a bore 352 to engage the hub diameter 353 of the hub 342 and being that the top plate 354 of the micrometer column has an extended portion 355 with a hub 356 engaging the reduced diameter 357 of the stationary column 340 the micrometer column position can be changed without applying any harmful pressure to the lift bars 312 and 313. A gage stack alignment ring 358 engages the outside diameter 359 and the socket screws 360 secures the extended portion 361 of the a special gage block to the platform 362. Slots 363 allow the gage column to be properly aligned before securing the the extended portion 361 firmly in place.

The modification in FIG. 31 consist of micrometer screw bearing adjusting bushing 364 consisting of a threaded bore 365 engaging the upper end of the micrometer screw and a reduced diameter engaging the reduced diameter 366 of the micrometer screw and secured in place by the set screw 367 after the upper face of bushing 364 is brought to bear against the lower face of the inner race 239 and the proper play has been set. A motor 368 is secured to the bottom of the housing 318 with clutch element 369 having a square elongated shaft 370 freely engaging a corresponding square bore within the center of the micrometer screw and mating clutch plate 371 secured to the upper end of the motor shaft 372 while at the lower shaft end 373 engages a bearing 374 pressed fitted in the housing 324. The upper end of an actuating rod 375 engages the bottom of the upper clutch plate 369 and the lower spherical end engages the surface 376 of the cam block 377 as the block 377 is pushed inward by gripping the handle 378 and pressing inward the upper clutch element 369 is released and due to gravity moves downward, thereby engaging the mating clutch plates 369 and 371. Gripping the cam handle 378 and pulling outward causes the lower spherical end 379 of the actuating rod 375 to engage an inclined cam surface 380 and rises to the higher cam surface 381 thereby raising and disengaging the clutch plate 369. A brake 382 is actuated by the freely attached pressure screw 382A.

The modification of FIGS. 32, 33 and other related figures consist mainly of a single lift bar micrometer mechanism, an adjustable micrometer column, a scriber setting unit with 0.001 spaced annular grooves 136 to coincide with the new unique 0.001 gage blocks. A single lift bar 383 having integral alignment hubs 384 engaging alignment rods 385 with the ends freely engaging the bores 386 and secured in place by the split washer 387 and nut 388. A tapered roller bearing 390 engaging a bearing bore 389 in the lift bar 383 in a manner that the weight of the lift bar and the other elements it 383 supports bears downward on the roller bearings 390, inner race 391 and micrometer screw 392 causing a gravity play elimination. The micrometer mechanism is a dual adjusted type that was previously explained. An elongated square bore through the center of the micrometer screw 392 engages a corresponding square bore of an elongated shaft 370 and an integrally attached male clutch member 369 is seperated from the female clutch member 371 that is secured to the upper end of the motor shaft 373 of the motor 368 that is secured to the bottom of the housing 318 by the spherical end 393 of the actuating shaft 375 engaging the bottom of the clutch plate 369 and the said actuating shaft 375 engaging a corresponding through bore within the center of the motor shaft 373 brings the lower spherical end 379 in contact with the upper surface of the cam block 377 thereby disengaging the clutch plate members 369 and 371. The clutch members are engaged by gripping the side handle 393 and sliding it back towards the slide element column 394 thereby allowing the lower spherical end 379 to slide down the inclined cam surface to the lower cam stop surface 376 causing the clutch member 369 detents 395 to engage corresponding bores 396 in the clutch member 371 which is secured to the motor shaft by the set screw 397 and keyed in position by the key 398. In FIGS. 33 and 37a brake housing 282 having a brake lining 399 and a semi-circular groove 400 for engaging the motor shaft diameter 401 is freely secured to the reduced diameter 402 of the threaded pressure screw 403 by the diameter of a set screw 404 engaging the reduced diameter groove 405 and the set screw 404 secured in place by a lockwasher 406 and nut 407. The brake 282 is keyed in positioned by the key shaft 408 that is press fitted in the extension brake housing 409 and freely fitted in a bore 410 within the housing 318. To operate the knurl knob 411 is gripped and turned clockwise to bring pressure on the motor shaft 373 to instantly stop the motor after the power is turned off and when the shaft 373 is completely braked the said knob 411 is turned counter-clockwise to permit the micrometer screw to be manually rotated to position the relative gage surface in a desired position for obtaining a micrometer reading or scriber setting position.

In FIG. 33a T-Slot 411 in the base utilizing a standard bolt 413 and nut 414 holding means shown in FIG. 26 engages through bores in the micrometer column base plate 416, thereby securing the micrometer column adjustably in place. The bolt 413 enters the T-Slot 411 by way of the opening 417 and is removed in the same place 417.

The scriber setting unit is similar to the one shown in FIG. 1 except for the previous mentioned slight variations due to the use of the 0.001 thick gage blocks.

The gage block column in FIG. 16 is enclosed with a flexible cover 418 having identification lines spaced 1 inch apart for unit identification with the 1 inch markings on the associated scale rods and starting with the lowermost gage block of the basic gage column or extension gage stack the one inch markings or lines are designated A, B, C, D, etc. for easier identification. The cover 418 is flexible to get around the projected measuring tabs and it 418 is directly wrapped around the gage blocks whereas in FIG. 32, 33 and 34 etc. side plates 419 are attached to the L-Shaped gage block support and a front plate 415 is attached to the bottom of the L-Shaped block support and side plates 419 before the flexible cover 418 is assembled. Special gage block 420 having an extended end 421 is secured to angle plate 422 by the socket screws 423 and it 422 is secured to the lift bar 424 by the socket screw 425 securing the basic gage column firmly in place. The extension gage stack in FIG. 38 and 40 is added to the basic gage column in FIG. 33 the same way it is added to the basic gage column in FIG. 16 as previously explained. The 0.001 gage blocks having a stepped horizontal row of five tab-like projections requires a block with a center tab 426 for each stepped row as the gage block can be inverted to obtain the right tab position for the alternating double row utilized by the scriber setting unit, whereas the two adjacent tab-like projections are similar and the two outer tab-like projections are similar and can be inverted for the scriber setting unit tabs thereby requiring only three different gage blocks instead of five.

The multiple extension gage stack 299 gage blocks are firmly secured together by one threaded end 427 of a shaft 428 engaging a flat head screw type bushing 429 at the bottom of the gage stack 299 and the upper threaded end 430 engaging a threaded bore 431 in the upper flat head screw type bushing 432 which has a non-threaded bore 433 at the top for receiving the head 433a of a bolt 434 that engages a bore in the bushing 432 and its 434 threaded end 297 extends through the shaft 428 to engage the threaded bore in the top of the basic gage column or extension gage stack to secure them in place. A threaded bore 296 in the bolt head 433A is for further extending the height of the gage column.

In FIG. 32 is shown a telescoping extension scale 436A having inserted scales 436 and 436B which can be extended as as the gage column is increased in height.

In FIG. 16 bearing bushing 437 held in place by the snap lockring 438 engages the uppermost outside diameter of the micrometer lift shaft 222 and is precisely aligned with the bore engaging the non-threaded diameter portion 227A of the micrometer lift shaft 222.

In FIG. 31 a stepped retainer plate 439 maintains the cam block 377 and actuating shaft 375 in place and is secured to the housing 324 by the flat head screws 440.

The 0.001 gage blocks are shown in FIG. 33 and related FIGS. 39, 41 and 42 to be stabilized by the flange 443 of the special gage block 441 having an extension 442, secured to an angle plate 444 which is secured to the gage lift bar 284 after properly aligned to the bottom surface of the device, by socket screws 445.

In FIG. 28 is a micrometer screw illustrating the micrometer threads 446 as a seperate part and being secured to a micrometer shaft 447 by the dowel pins 448. At the bottom of the shaft is a bore 370A square in cross-section for engaging the square elongated shaft 370.

It is to be understood that the form of my invention, herewith shown, described and illustrated is to be taken as a preferred example of the same, and that the various changes in size, shape and arrangement of parts may be resorted to without departing from the scope of my invention, or appended claims.

What I claim is:

1. In a height gage, a base having a pair of spaced apart interdependent linear structures extending vertically therefrom, one of said structures consisting of a micrometer mechanism means mounted on a vertically extending support member, said micrometer means including thimble and screw means connected thereto forming rotative manipulating means; raising and lowering means operatively connected to said rotative manipulating means and extending horizontally from said support member; said other linear structure consisting of an elongated vertically arranged hollow member having internal guide means and a pair of elongated slots therein communicating with the hollow interior of said member, an elongated slide element guided within said hollow member by said guide means, said slide element having portions extending through said slots, one of said portions being connected to said raising and lowering means for movement therewith; an extendable longitudinal gauge stack suspended from and secured to the other portion of said slide element, said gage stack consisting of superimposed gage members with serveral step-like co-planar measuring surfaces, said gage stack, slide element and raising and lowering means being thus interconnected and co-acting for simultaneous raising and lowering when the thimble of the micrometer means is manipulated clockwise and counterclockwise.

2. In a height gage, a base having interdependent stationary dual linear structures engaging inter-connected co-acting gage lifting elements, one of said structures consisting of a micrometer mechanism mounted on a longitudnal support member and operatively connected to a raising and lowering means that is secured to a linear slide element engaging the other said linear structure, an extendable longitudnal gage stack suspended from and secured to said slide element, said gage stack consisting of superimposed flat gage members with tab-like projections forming several step-like co-planar measuring surfaces, said gage stack keyed in position by the said slide element and connecting raising and lowering means being keyed in place by said dual linear structures rigid attachment to said base, a flexible lengthwise covering enveloping the said longitudnal basic gage stack with openings for receiving the cross-sectional shape of said tab-like gage-projections, a group of unit spaced scored lines including adjacent characters to identify said scored lines in reference to an extendable basic scale graduated in related unit measure ment, an extension rod attachable to the top of said basic scale, a hollow tube with several unit scale ranges graduated upon said hollow tube's outside diameter, said tube engaging said extension rod with a consecutive longitudnal range scale graduated line in line with a longitudnal graduated line on the adjacent scale length, a multiple extension gage stack including extension securing means and said covering, an adjustable gage stack protective means, a base of a unit spaced annular grooved extendable shaft secured to the bottom end of said gage stack, said shaft parallel to said gage stack, a slidable and rotatable scriber setting mechanism mounted on said shaft consisting of a shaft pressure means, a lockscrew for locking said scriber mechanism to said shaft, a selective co-planar detents alignment means for engaging said unit spaced annular grooves of said shaft one at a time in relation to said scriber mechanism's projected co-planar gage surfaces that selectively engage a gage surface of the related alternating longitudnal rows of co-planar gage surfaces of said longitudnal gage stack, an auxiliary alignment rod secured to said base and engaging a corresponding bore in the lower end of said gage stack, a clutch and power driving means mounted directly below and engaging said raising and lowering means within the said linear structure that includes the micrometer mechanism, a cover for enclosing the said dual linear structures that permits the exposure of the micrometer graduated parts and operation of said gage stack, the said inter-connected and co-acting elements are raised or lowered simultaneously when manipulating said micrometer thimble in a counter-clockwise or clock-wise direction.

3. In a height gage, a base having interdependent stationary dual linear structures engaging inter-connected co-acting gage lifting elements, one of said structures consisting of a micrometer mechanism mounted on a longitudnal support member and operatively connected to raising and lowering means that is secured to a linear slide element engaging the other said linear structure, an extendable longitudnal gage stack suspended from and secured to said slide element, said gage stack consisting of superimposed gage members with tab-like projections forming several consecutive step-like co-planar measuring surfaces, said gage stack keyed in position by the said slide element and connecting raising and lowering means being keyed in place by said dual linear structures rigid attachment to said base, a flexible lengthwise covering enveloping the said longitudnal basic gage stack with openings for receiving the cross-sectional shape of said tab-like gage projections, a group of unit spaced scored lines including adjacent characters to identify said scored lines in reference to an extendable basic scale graduated in related unit measurement, an extension rod attachable to the top of said basic scale, a hollow tube with several unit scale ranges graduated upon said hollow tube's outside diameter, said tube engaging said extension rod with a consecutive longitudnal range scale graduated line in line with a longitudnal graduated line on the adjacent scale length, a multiple extension gage surface at the top of said gage stack, an adjustable gage stack protective means, a base of a unit spaced annular grooved extendable shaft secured to the bottom end of said gage stack, said shaft parallel to said gage stack, a slidable and rotatable scriber setting mechanism mounted on said shaft consisting of a shaft pressure means, a lock-screw for locking said scriber mechanism to said shaft, a selective co-planar detents alignment means for engaging said unit spaced annular grooves of said shaft one at a time in relation to said scriber mechanism's projected co-planar gage surfaces that selectively engage a gage surface of the related alternating longitudnal rows of co-planar gage surfaces of said longitudnal gage stack, an auxiliary alignment rod secured to said base and engaging a corresponding bore in the lower end of said gage stack, means for mounting a clutch directly below said raising and lowering means within the said linear structure that includes the micrometer mechanism, a cover for enclosing the said dual linear structures that permits the exposure of the micrometer graduated surfaces and operation of said gage stack, the said inter-connected and co-acting elements are raised or lowered simultaneously when manipulating said micrometer thimble in a counter-clockwise or clock-wise direction.

* * * * *